United States Patent [19]

Mueller

[11] Patent Number: 4,608,422
[45] Date of Patent: Aug. 26, 1986

[54] PREPARATION OF HYDROXYL-CONTAINING POLYMERS

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 710,026

[22] Filed: Mar. 11, 1985

[30] Foreign Application Priority Data

Mar. 20, 1984 [DE]  Fed. Rep. of Germany ....... 3410069

[51] Int. Cl.$^4$ .............................................. C08F 8/04
[52] U.S. Cl. ..................................... 525/410; 525/62; 525/339
[58] Field of Search .......................... 525/62, 410, 339

[56] References Cited

U.S. PATENT DOCUMENTS 4,009,124 2/1977 Laurer et al. ...................... 252/463
4,163,115 7/1979 Heinsohn et al. .................. 560/240

FOREIGN PATENT DOCUMENTS 2445962  4/1976  Fed. Rep. of Germany .
2445960  4/1976  Fed. Rep. of Germany .
2445303  4/1976  Fed. Rep. of Germany .
2709280 10/1977  Fed. Rep. of Germany .
 963911  7/1964  United Kingdom .
1513556  6/1978  United Kingdom .

Primary Examiner—Joseph L. Schofer
Assistant Examiner—Bernard Lipman
Attorney, Agent, or Firm—John H. Shurtleff

[57] ABSTRACT

Hydroxyl-containing polymers are prepared by catalytic hydrogenation of acyloxy-containing polymers by a process in which a strong base is added to the acyloxy-containing polymers before or during the hydrogenation.

4 Claims, No Drawings

PREPARATION OF HYDROXYL-CONTAINING POLYMERS

The present invention relates to a process for the preparation of hydroxyl-containing polymers, in particular the preparation of polytetrahydrofuran containing terminal hydroxyl groups, by catalytic hydrogenation of the corresponding acyloxy-containing polymers in the presence of a strong base.

Polytetrahydrofuran is usually prepared from tetrahydrofuran using a cationic catalyst system, the resulting polytetramethylene ether possessing various terminal groups determined by the catalyst system and the reaction medium. Polytetrahydrofurans are therefore of the general formula $$X-[CH_2)_4-O]_n-(CH_2)_4-Y,$$

where n is an integer from 1 to about 100, which characterizes the molecular weight, and X and Y may be, for example, the following radicals:

| Catalyst system | X<br>RO | Y<br>OH, F, Cl |
|---|---|---|
| $R_3O^+ ML_m^- + 1$ | | |
| $ML_m^- + 1$:BF4, SbCl6 | | |
| FeCl4, AlCl3 | | |
| FSO3H | FSO3 | OH |
| AlCl3/CH3COO | CH3COO | Cl |
| HClO4/(CH3CO)2O | CH3COO | CH3COO |
| SbCl5/(CH3CO)2O | CH3COO | CH3COO |

R is a hydrocarbon radical and m is the valence of the Lewis acid $ML_m$.

Since polytetrahydrofurans are mainly used for the preparation of polyurethanes, and for this purpose the polymers must contain terminal hydroxyl groups, it is necessary for the terminal groups X and Y in the polytetrahydrofurans initially obtainable to be converted to hydroxyl groups. Most of the methods disclosed to date employ alkaline hydrolysis, such a method being described in, for example, U.S. Pat. No. 3,358,042. The difficult process engineering problems which arise in the hydrolysis reaction of macromolecular substances are overcome here by carrying out the reaction in special solvents. The additional solvent cycle required for this purpose, and the seven process stages, make the process uneconomical. Moreover, the process results in a substantial salt load and therefore causes pollution. Depending on the molecular weight of the polytetrahydrofuran prepared, this salt load is from 10 to 35%, based on the polymer.

Hydrolysis initiated by alkaline catalysts has not proven very suitable in the case of the acyloxycontaining polymers, since the formation of emulsions which are difficult to break and have a pronounced tendency to foam can scarcely be avoided, so that catalysts and water are difficult to separate from one another. Frequently, colored reaction products are also obtained. The transesterification, initiated by alkaline catalysts of the acyloxy-containing polymers with lower alcohols also gives rise to considerable difficulties. In this process, there is a risk that the products obtained will be discolored yellowish to brown, and substantial amounts of catalyst are required in order to achieve complete transesterification. For example, for the transesterification of polytetrahydrofuran with methanol in the presence of the most effective transesterification catalyst, sodium methylate, not less than from 1,000 to 10,000 ppm by weight of the alcoholate must be used in order to obtain a product having a residual hydrolysis number of <1 mg of KOH/g. Since, after the transesterification, the catalyst has to be removed from the product for example by washing with water, substantial working up costs are involved, in addition to the relatively high catalyst costs. For this reason, German Laid-Open Application No. DOS 2,709,280 proposes the use of oxides or hydroxides of calcium, barium, strontium or magnesium as transesterification catalysts, since these compounds can be more readily separated off by filtration after the transesterification. However, this method has the disadvantage which is associated with every transesterification reaction: separating off the lower boiling ester by distillation requires a substantial amount of energy and makes the end product considerably more expensive.

According to German Laid-Open Applications Nos. DOS 2,445,962 and DOS 2,445,960, acyloxy-containing polymeric substances can be hydrolyzed in an aqueous salt solution in the presence or absence of an alcohol which is insoluble, or has only limited solubility, in water, an acid being used as a catalyst for the hydrolysis. German Laid-Open Application DOS 2,445,959 describes a process for the transesterification of acyloxy-containing polymeric substances in a mixture of water and an alcohol in the presence of a hydrogen halide as a catalyst. Using these methods, it is possible to obtain hydroxyl-containing polymeric substances in substantial yields. However, these processes, too, have certain disadvantages. For example, the strong inorganic acids used as transesterification catalysts have to be removed from the polymer, by washing with water, when the reaction is complete. This leads to the above-mentioned formation of emulsions which are difficult to break and which have a pronounced tendency to foam. Furthermore, the acidic aqueous salt solutions result in a certain amount of environmental pollution. When an acidic catalyst is used, there is also a danger of undesirable dehydration after transesterification, and hence of the formation of double bonds in the molecule.

It is an object of the present invention to provide a process for the preparation of hydroxyl-containing polymers from the corresponding acyloxy-containing polymers which is simpler to carry out, causes less pollution and does not have the disadvantages described.

We have found that this object is achieved, and that particularly advantageous results are obtained in the preparation of hydroxyl-containing polymers by catalytic hydrogenation of acyloxy-containing polymers, if a strong base is added to the acyloxy-containing polymers before or during the hydrogenation.

Examples of acyloxy-containing polymers which are suitable starting materials are homopolymeric and copolymeric alcohols esterified with carboxylic acids, preferably formic acid or acetic acid. These polymers are usually obtained by homopolymerization or copolymerization of the corresponding ester-containing monomers, such as isopropenyl allyl or vinyl acetate, by, for example, free radical polymerization. Copolymers of these monomers with other olefinically unsaturated copolymerizable monomers, such as olefins, vinylaromatics or vinyl halides, e.g. styrene, ethylene, butadiene or vinyl chloride, are also suitable.

Particularly suitable starting materials are polytetrahydrofurans which contain acyloxy groups, in particular formate and acetate groups, and have a molecular weight of from 300 to 5,000. These are compounds of the above formula in which one or both of the radicals X and Y are acyl.

In the novel process, a strong base is added to the acyloxy-containing polymers before or during the hydrogenation. Examples of suitable bases are oxides, hydroxides or alcoholates of alkali metals or alkaline earth metals, such as the oxides or hydroxides of calcium, barium, strontium or magnesium. Calcium oxide and calcium hydroxide are preferred; they are usually particulate or, advantageously, in the form of a powder. Alcoholates are, for example, alkoxides containing alkyl radicals of 1 to 4 carbon atoms. The concentration of the basic compounds in the starting mixtures for the hydrogenation is, for example, from 0.001 to 1, preferably from 0.01 to 0.1, % by weight.

Hydrogenation is carried out in the presence of a catalyst, suitable catalysts being those usually employed for the conventional hydrogenation of carboxylates, e.g. catalysts based on iron, copper, nickel, cobalt, silver, platinum and palladium, which can also contain added chromium, manganese, molybdenum, vanadium, tungsten and zinc. Particularly suitable hydrogenation catalysts are those which contain copper as the active metal. The copper can be applied on a suitable carrier such as alumina, silica gel, pumice or magnesium silicate, or can be precipitated together with the carrier in a suitable manner and subsequently brought to a suitable form. A particularly useful catalyst of the stated type is described in, for example, German Laid-Open Application No. DOS 2,445,303.

The hydrogenation is carried out at, for example, from 180° to 280° C., preferably from 200° to 250° C., and under a hydrogen pressure of, for example, from 200 to 300 bar. The hydrogenation is advantageously carried out by the conventional trickle-bed procedure, in which the polymer to be hydrogenated trickles down over the fixedbed catalyst in the reaction oven in the presence of hydrogen, the hydrogenation product being collected in a separating vessel.

Particularly advantageous results are obtained if the acyloxy-containing polymers are hydrogenated in the presence of the bases and of an alcohol. Suitable alcohols are lower alcohols, e.g. alkanols of 1 to 5 carbon atoms, such as methanol, ethanol and propanol. The concentration of the alcohols in the mixture to be hydrogenated is, for example, from 5 to 70, preferably from 10 to 50, % by weight.

In the novel process, the desired hydroxylcontaining polymers have color numbers of <10 APHA and are obtained readily and in a particularly economical manner. This advantageous result was surprising. For example, the hydrogenation of the acyloxy-containing polymers can be substantially accelerated by adding a base to the polymer. Furthermore, in contrast to the base-free hydrogenation, complete hydrogenation of the hydroxylcontaining polymers is achieved. Usually, when a polytetrahydrofuran which has a molecular weight of 1,000 and a hydrolysis number of 112 mg of KOH/g and whose molecules carry terminal acetyl groups is hydrogenated, the residual hydrolysis number is >5 mg of KOH/g when conventional copper-containing catalysts for ester hydrogenation are used, even for residence times of from 40 to 60 hours and under hydrogenation conditions as extreme as 250° C. and 300 bar hydrogen pressure. By means of the hydrogenation according to the invention, this hydrogenation time is substantially reduced, for example by a factor of as much as 0.01. Furthermore, residual hydrolysis numbers of 0.1 mg of KOH/g are achieved.

In the preparation of copper catalysts which are suitable for the hydrogenation of carboxylates, the addition of alkali metal compounds has also been proposed (cf. German Pat. No. 1,159,925). However, these catalysts do not possess a particularly advantageous activity in the hydrogenation of acyloxy-containing polymers. It was therefore not to be expected that the addition, in accordance with the invention, of a base to the polymer to be hydrogenated will permit the hydrogenation to be carried out quantitatively in so short a time and at such low temperatures. Surprisingly, it was also found that the usual life of the hydrogenation catalysts when they are used in the process according to the invention is substantially exceeded.

In the Examples which follow, parts are by weight, and parts by weight bear the same relation to parts by volume as that of the kilogram to the liter.

EXAMPLE 1

A mixture of 900 parts of an ethylene/vinyl acetate copolymer having a molecular weight of about 2,000 and containing about 30% of vinyl acetate, and 800 parts of methanol and 0.1 part of calcium hydroxide is subjected to hydrogenation in a shaft oven under the conditions stated below.

1,000 parts by volume of the catalyst prepared as described in Example 21 of German Laid-Open Application No. DOS 2,726,710, having the composition $CuO \times \frac{1}{2}Co_2O_3 \times 2\ SiO_2$ and in the form of cylindrical tablets 3 mm high and 3 mm in diameter are introduced into a shaft oven. The ratio of the length of the shaft oven to its diameter is 58:1. The oven is charged with 100 parts by volume/hour of the mixture described above, at 200° C. At the same time, 4,000 parts by volume of the feed are circulated by being recycled continuously.

At the beginning of the hydrogenation, during the heating up phase, hydrogen is forced in up to a pressure of 10 bar, in order initially to effect careful reduction of the catalyst in the liquid phase. The hydrogen pressure is then slowly increased from 10 to 250 bar. Above 150° C., reduction of the catalyst begins, this being indicated by a marked exothermic reaction. As soon as this has died down, the temperature is increased to 230° C. and the hydrogen pressure brought to 250 bar. During the reduction, 50 parts by volume (S.T.P.)/hour of hydrogen are removed from the oven, as an exit gas. A solution of a hydroxyl-containing polymer is removed from the oven. When the methanol, and the ethanol formed during the hydrogenation, has been distilled off, the polymer has a residual ester number of 0.85 mg of KOH/g. If, before being worked up, the polymer solution is passed once again through the hydrogenation oven under the stated conditions, a hydroxyl-containing polymer is obtained which has an ester number of about 0.1 and a color number of <10 APHA.

A similar result is obtained if the procedure described is followed and a carrier-free catalyst prepared in the following manner is used: a mixture of 66% by weight of copper oxide and 31% by weight of chromium oxide is prepared by thorough mechanical mixing of the oxides or carbonates of copper and chromium, obtained by precipitating the nitrates or ammonium compounds of the metals together and drying the product. The mixture is pressed to tablets, which are heated at 350° C.

EXAMPLE 2

3% by weight of ethanol and 0.15% by weight of sodium ethylate are added to a polytetrahydrofuran which has a molecular weight of 1,000 and a hydrolysis number of 112 and whose molecules carry terminal acetyl groups. This mixture is hydrogenated in the hydrogenation apparatus described in Example 1, under the conditions stated there (250 bar of hydrogen, 230° C.), but using the catalyst which contains copper and aluminum and is obtainable as described in Example 1 of German Laid-Open Application No. DOS 2,445,303. After a single passage through the hydrogenation oven, and after the ethyl alcohol added and that formed have been separated off, a polytetramethylene ether glycol having a hydroxyl number of 111 mg of KOH/g is obtained. The residual ester number is determined as 1.32 mg of KOH/g. If the polytetramethylene ether glycol obtained after a single passage is again subjected to hydrogenation under the stated conditions, the resulting product has a residual hydrolysis number of <0.1 mg of KOH/g and a color number of <10 APHA.

If the hydrogenation is carried out continuously, it is possible to dispense with the initial addition of ethanol to the fresh feed, without any marked change in the result.

We claim:

1. In a process for the preparation of a hydroxyl-containing polymer by catalytic hydrogenation of an acyloxy-containing polymer, the improvement which comprises:
    hydrogenating at from 180° to 280° C. and under a hydrogen pressure of from 200 to 300 bar a mixture containing
    (a) an acyloxy-containing polytetrahydrofuran having a molecular weight of from 300 to 5,000,
    (b) a strong base selected from the group consisting of the oxides, hydroxides and alcoholates of alkali and alkaline earth metals, and
    (c) an alcohol having 1 to 5 carbon atoms, the concentration of the strong base in said mixture being from 0.001 to 1% by weight and the concentration of the alcohols in said mixture being from 5 to 70% by weight.

2. A process as claimed in claim 1, wherein the acyloxy groups of the polytetrahydrofuran are selected from the group consisting of formate and acetate.

3. A process as claimed in claim 1, wherein the concentration of the alcohol in the mixture to be hydrogenated is from 10 to 50 percent by weight.

4. A process as claimed in claim 1, wherein the hydrogenation is carried out for a period of time sufficient to reduce the residual hydrolysis number of the product to a value of 0.1 mg of KOH/g or less.

* * * * *